May 27, 1958     H. J. BRAUN     2,836,743
PERMANENT MAGNET ROTOR
Filed Jan. 25, 1956
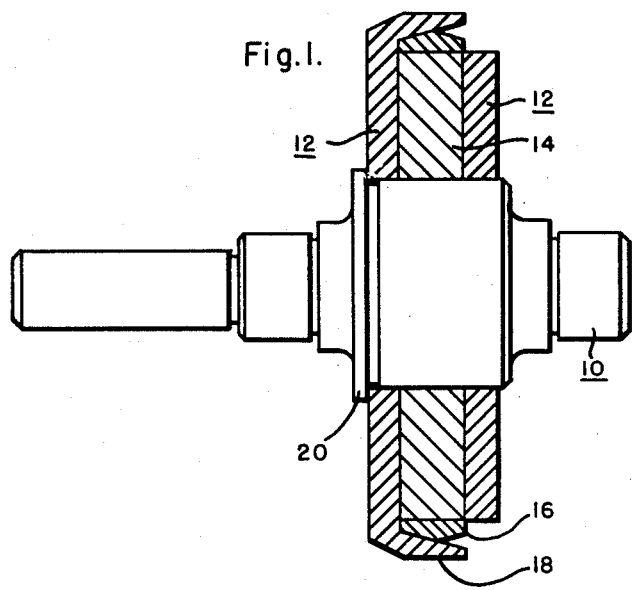
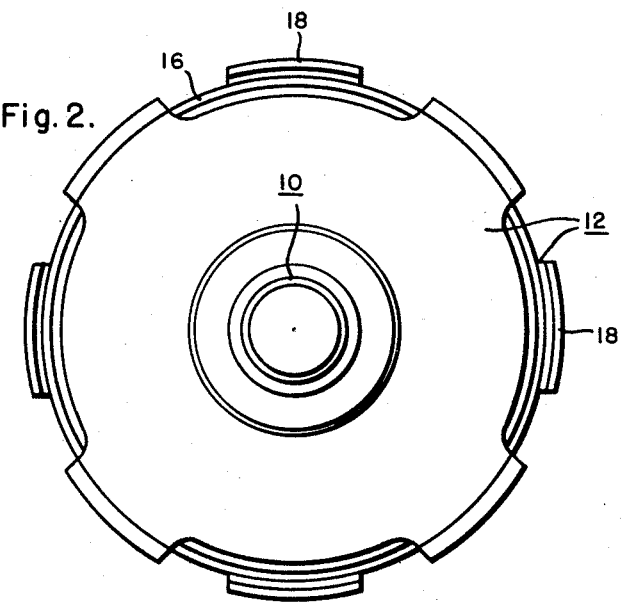
WITNESSES
INVENTOR
Herman J. Braun,
BY
ATTORNEY

United States Patent Office 2,836,743
Patented May 27, 1958

2,836,743

PERMANENT MAGNET ROTOR

Herman J. Braun, Shawnee Township, Allen County, Ohio, assignor to Westinghouse Electric Corporation, East Pittsburgh, Pa., a corporation of Pennsylvania Application January 25, 1956, Serial No. 561,290

5 Claims. (Cl. 310—156)

This invention pertains to dynamoelectric machines, and more particularly to a permanent magnet rotor for such a machine.

High efficiency, permanent magnet materials, such as the ferrite ceramic type materials, and aluminum-nickel-cobalt alloys, which have high flux density, are available and are very desirable for use in permanent magnet rotors. The use of these alloys in such rotors, however, involves several problems that much be solved if the rotor is to be successful. One of these problems arises from the low strength of these materials which means that a mechanical support must be provided when the rotor is operated at high speed in order to prevent mechanical failure or rupture of the magnetic material. Another problem that arises is that the flux density of these materials changes inversely with a change in temperature. This change in flux density results in decreasing voltage output with increasing temperature when the rotor is used in a generator.

Accordingly, the principal object of this invention is to provide a permanent magnet rotor using a high efficiency, permanent magnet material in which the rotor has substantially constant flux regardless of the changes in temperature of the rotor.

Another object of this invention is to provide a permanent magnet rotor for a dynamoelectric machine which uses a high flux density permanent magnet material which is capable of rotating at high speeds without damaging the magnetic material.

These and other objects of this invention will be more easily understood by those skilled in the art from the following detailed description, when taken in connection with the accompanying drawing, in which:

Fig. 1 is a longitudinal section of a permanent magnet rotor constructed in accordance with this invention with the rotor shaft shown in elevation, and Fig. 2 is an end view of the rotor shown in Fig. 1.

The rotor of this invention consists of a shaft 10 on which two pole pieces 12 are mounted with a disc-shaped permanent magnet 14 placed between the two pole pieces 12. The shaft 10 should preferably be formed of a non-magnetic material, such as stainless steel, and is provided with a shoulder 20 so that the pole pieces may be accurately positioned. The pole pieces 12 are disc-shaped and have a plurality of poles 18 which project axially from the outer periphery of each pole piece. The pole pieces 12 may be formed of any magnetic material but preferably are formed from magnetic steel. The two pole pieces 12 shown in Figs. 1 and 2 are identical in design and are placed on the shaft so that the poles 18 of the two pole pieces alternate to provide magnetic poles of alternately opposite polarity when the permanent magnet 14 is magnetized in the axial direction.

The permanent magnet 14 has a generally disc shape and is provided on its outer surface with a banding member 16. The permanent magnet 14 is preferably formed of a high flux density permanent magnetic material, such as a ferrite ceramic, for example, such as $Ni(Fe_2O_4)Zn(Fe_2O_4)$, or an aluminum-nickel-cobalt alloy. While these materials are both very efficient as permanent magnets, they have very little strength and some means of mechanical support must be provided in order to prevent their failure when the rotor is rotated at high speeds. This invention provides this mechanical support by means of the banding member 16 which is pressed over the outer diameter of the permanent magnet 14 or shrunk thereon to insure sufficient mechanical support for the magnet 14.

The banding member 16, besides providing mechanical support for the magnet 14, also provides a means for compensating for the increasing magnetic flux of the magnet 14 caused by a decrease in temperature. This compensation is provided by forming the member 16 from a material which has an increasing permeability with decreasing temperature. One material which meets this requirement is a steel having a nickel content of between 29 and 32 percent. When the banding member 16 is formed of such a material, it will shunt the increased flux of the magnet 14 away from the poles 18 of the two pole pieces 12 as the temperature decreases because of the increased permeability of the member 16. By bypassing the increased flux of the magnet 14, the flux density of the rotor will be substantially constant and will not change with the change in temperature. It will be understood that the member 16 may be made of any material, the permeability of which varies inversely with temperature, and the member 16 can readily be designed to provide any desired amount of shunting to keep the flux substantially constant or to permit it to vary in any desired manner with temperature.

While but one embodiment of this invention has been described in detail, it is susceptible to many modifications and changes without departing from its scope. For example, if a longer rotor is desired, additional pairs of pole pieces 18 with a disc of permanent magnet material 14 placed between each pair could be mounted on the shaft 10. Another advantage of this invention is that by using permanent magnet materials, such as the ferrites, it is not necessary to provide keepers for retaining the magnetization of the permanent magnet material when the rotor is disassembled or removed from the generator in which it is used. These materials are not affected by vibrations or shock which seriously affect other permanent magnet materials and thus are very desirable in aircraft generators which are subjected to severe vibration and shock. Accordingly, this invention should not be limited to the embodiment described above but only as required by the prior art.

I claim as my invention:

1. A permanent magnet rotor comprising, a shaft, a pair of axially spaced pole pieces mounted on said shaft, a disc-shaped permanent magnet mounted on said shaft between said pole pieces, and a supporting and compensating ring mounted on the outer periphery of said permanent magnet, said compensating ring being formed of a metal the permeability of which varies inversely with temperature.

2. A permanent magnet rotor comprising, a shaft, a pair of axially spaced pole pieces mounted on said shaft, a disc-shaped permanent magnet mounted on said shaft between said pole pieces, and a supporting and compensating ring mounted on the outer periphery of said permanent magnet, said compensating ring being formed of steel containing approximately 29 to 32 percent nickel and having a permeability which varies inversely with temperature.

3. A permanent magnet rotor for a dynamoelectric machine comprising, a shaft, a pair of axially spaced pole pieces mounted on said shaft, a disc-shaped permanent magnet mounted on said shaft between said pole pieces, said magnet being formed of a ferrite ceramic material whose magnetic flux increases with decreasing temperature and a supporting and compensating ring mounted on the outer periphery of said permanent magnet, said compensating ring being formed of a steel containing approximately 29 to 32 percent nickel.

4. A permanent magnet rotor for a dynamoelectric machine comprising, a non-magnetic shaft, a pair of axially spaced pole pieces mounted on said shaft, said pole pieces being formed of magnetic material, a disc-shaped permanent magnet mounted on said shaft between said pole pieces, said magnet being formed of an aluminum-nickel-cobalt alloy, and a supporting and compensating ring surrounding the outer periphery of said permanent magnet, said compensating ring being formed of a steel containing approximately 29 to 32 percent nickel.

5. A rotor for a dynamoelectric machine, said rotor comprising a shaft, a pair of spaced pole pieces mounted on said shaft, a disc-shaped permanent magnet mounted on the shaft between the pole pieces, said permanent magnet being made of a material in which the magnetic flux varies with temperature, and a supporting and compensating ring mounted on the outer periphery of the permanent magnet, said compensating ring being made of a magnetic material in which the permeability varies with temperature in substantially the same manner as the flux of the permanent magnet.

References Cited in the file of this patent

UNITED STATES PATENTS

| | | |
|---|---|---|
| 2,233,924 | McKibben | Mar. 4, 1941 |
| 2,648,019 | Rodanet | Aug. 4, 1953 |

FOREIGN PATENTS

| | | |
|---|---|---|
| 725,895 | Great Britain | Mar. 9, 1955 |